Oct. 30, 1962 J. H. ROBERTS 3,060,818
MULTI-WHEEL COMPACTOR ROLLER
Filed Dec. 30, 1958 9 Sheets-Sheet 1

INVENTOR;
JAMES H. ROBERTS,
BY David Young
ATT'Y.

Oct. 30, 1962 J. H. ROBERTS 3,060,818
MULTI-WHEEL COMPACTOR ROLLER
Filed Dec. 30, 1958 9 Sheets-Sheet 2

INVENTOR;
JAMES H. ROBERTS,
BY David Young
ATTY.

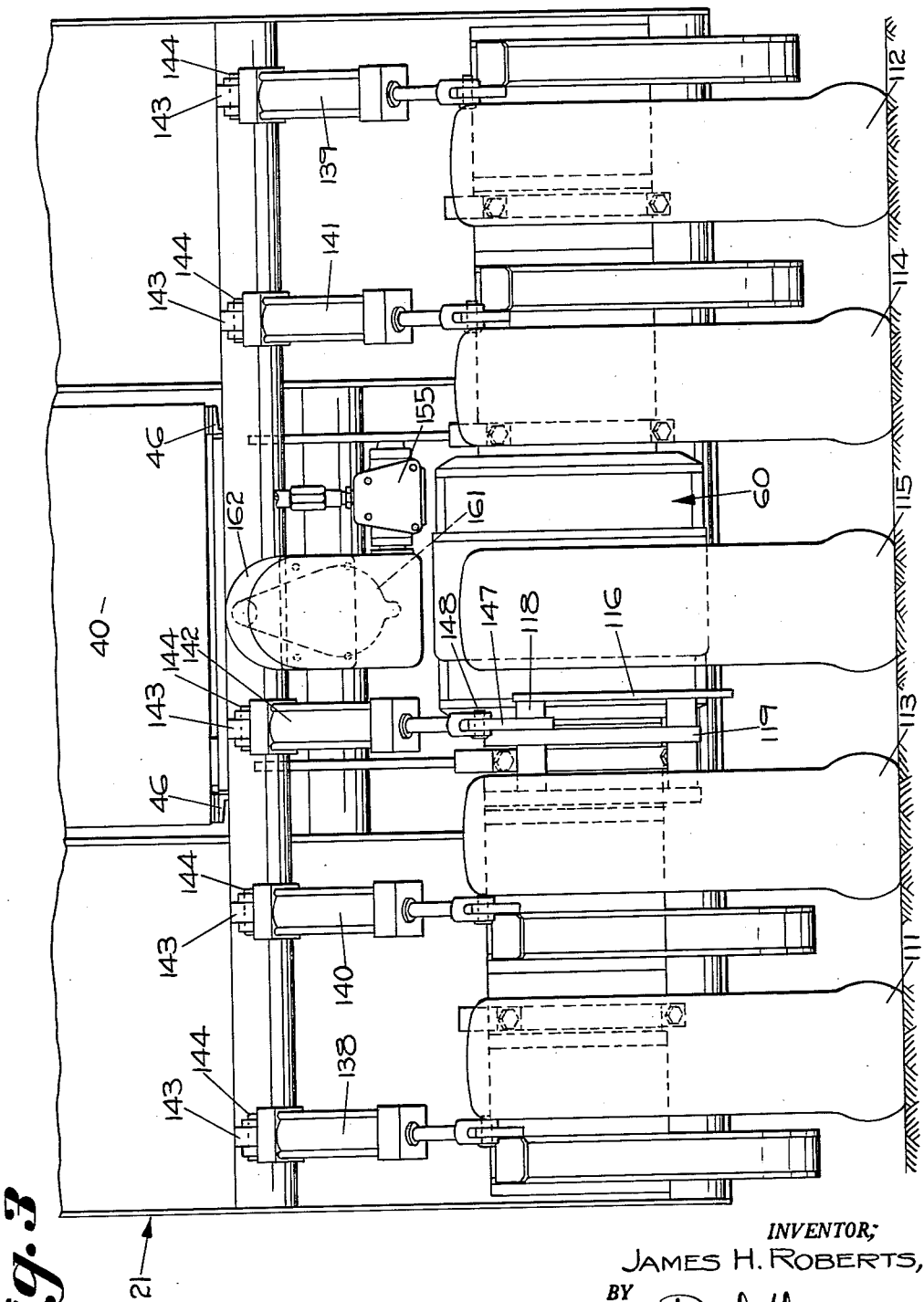

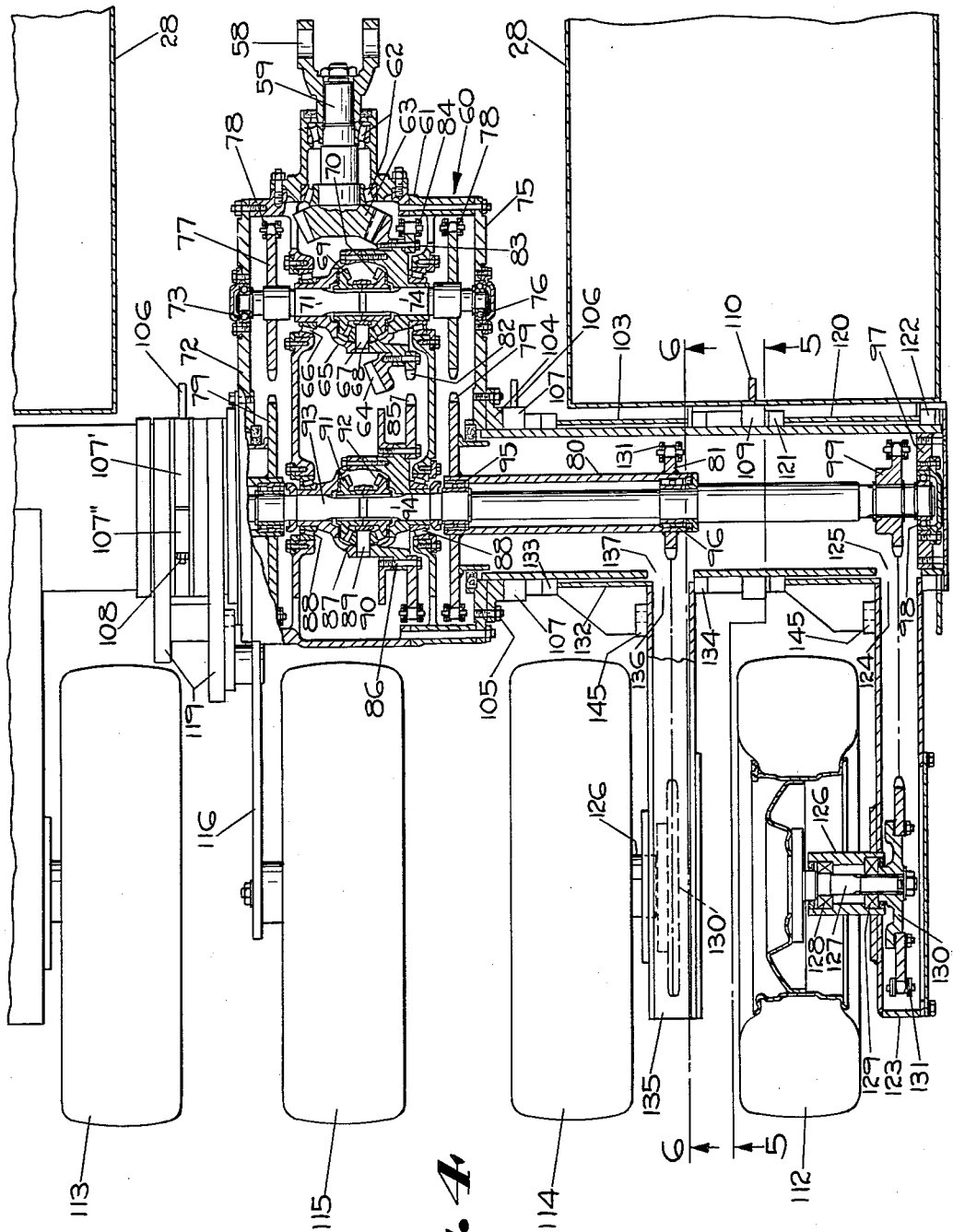

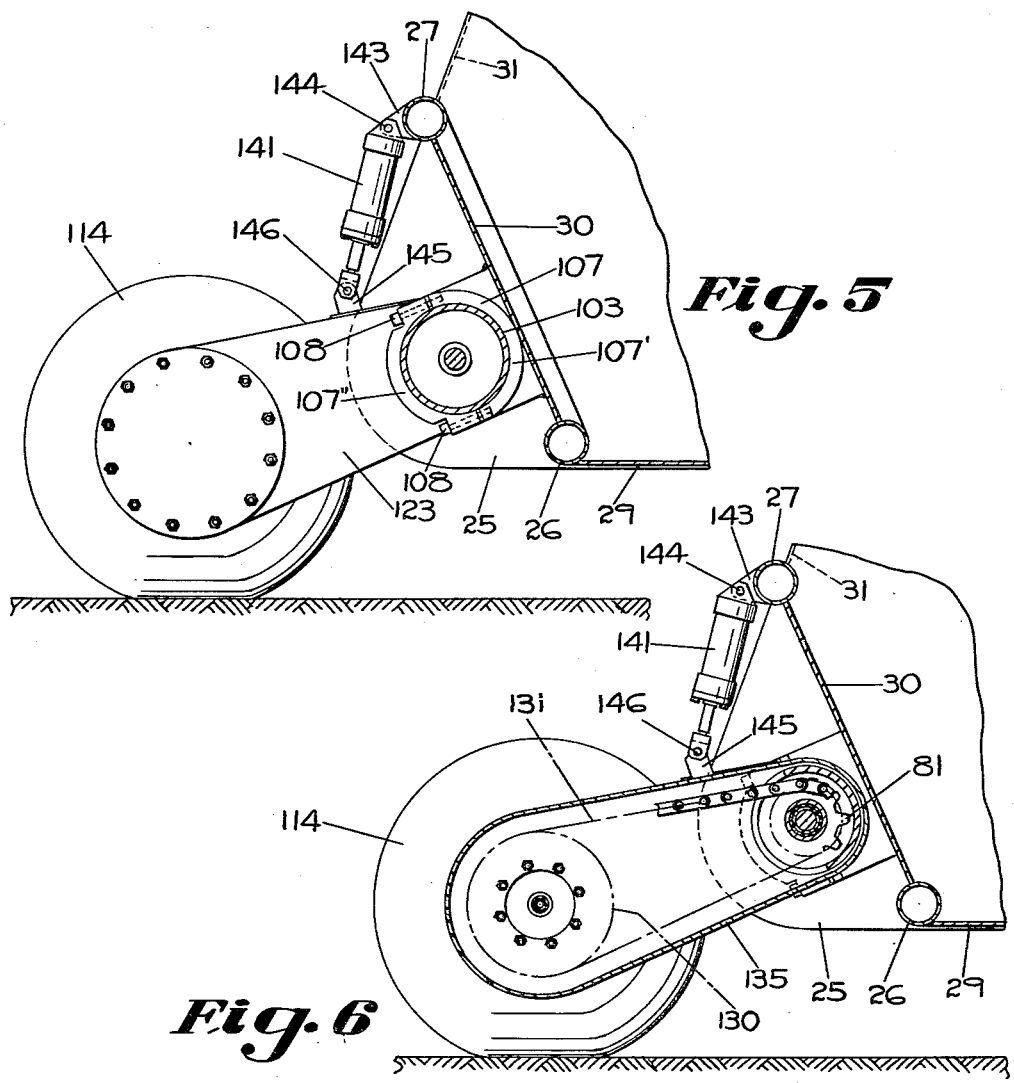
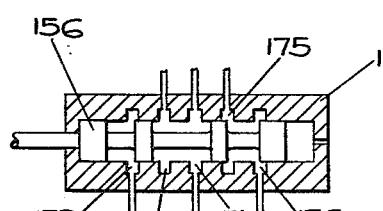
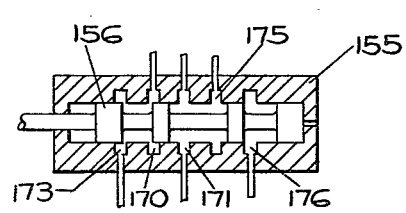

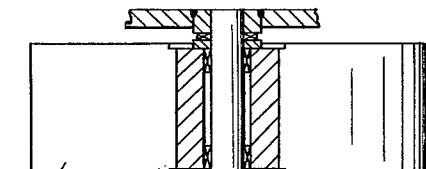
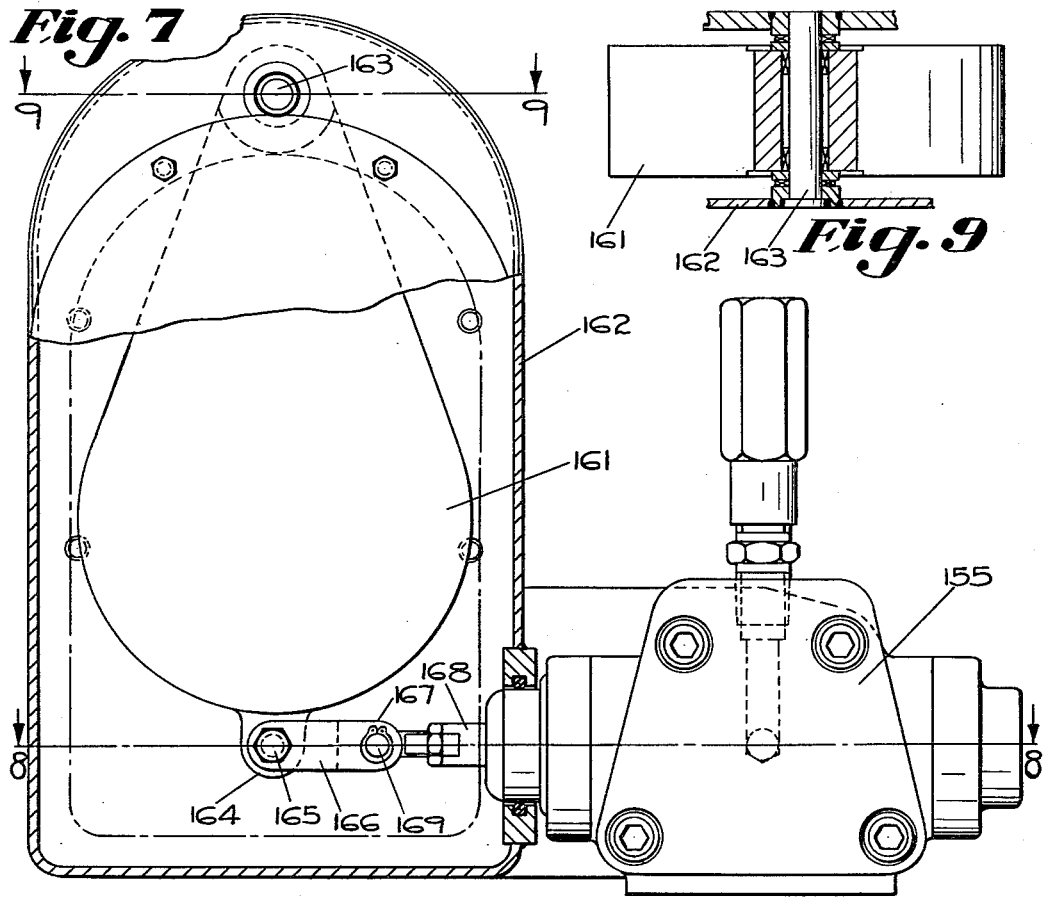
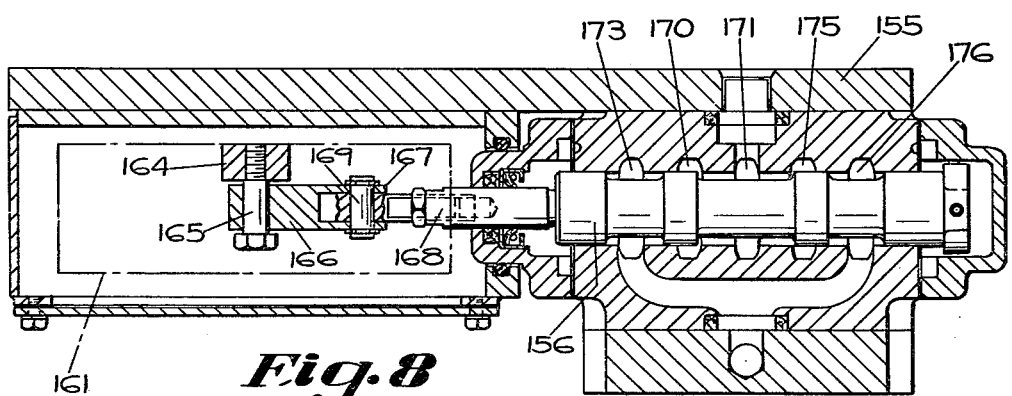

Oct. 30, 1962 J. H. ROBERTS 3,060,818
MULTI-WHEEL COMPACTOR ROLLER
Filed Dec. 30, 1958 9 Sheets-Sheet 7

INVENTOR.
JAMES H. ROBERTS,
BY David Young
ATT'Y.

INVENTOR;
JAMES H. ROBERTS,
BY David Young
ATTY.

United States Patent Office 3,060,818
Patented Oct. 30, 1962

3,060,818
MULTI-WHEEL COMPACTOR ROLLER
James H. Roberts, Galion, Ohio, assignor to Jeffrey Galion Manufacturing Company, a corporation of Ohio
Filed Dec. 30, 1958, Ser. No. 783,990
23 Claims. (Cl. 94—50)

The instant invention relates to a multi-wheel compactor roller comprising a plurality of wheels which are adapted to apply a high unit loading to a ground surface as the wheels are traversed over that ground surface, for the purpose of compacting the material of the ground.

It is the object of the instant invention to provide an improved multi-wheel compactor roller comprising a plurality of wheels adapted to be traversed over a ground surface, in which each of the wheels is individually adjustable in accordance with the contours of the ground surface, and each of the wheels is maintained in loaded contact with the ground surface for compacting the material of the ground.

It is another object of the instant invention to provide an improved multi-wheel compactor roller in which each of the wheels thereof is uniformly loaded to apply equal compacting forces on all areas of the ground surface traversed by the wheels.

It is a further object of this invention to provide an improved multi-wheel compactor roller comprising a plurality of wheels, each of which is individually adjustable in accordance with the contours of the ground surface, and including means for uniformly loading each wheel in all positions thereof to apply an equal force on all areas of the ground surface traversed by the wheels.

It is also an object of the instant invention to provide an improved multi-wheel compactor roller comprising a plurality of wheels which are individually adjustable in accordance with the contours of the ground surface and including individual means for each wheel to load the wheel in all positions thereof, said individual loading means being interdependent for uniformly loading each wheel in all positions thereof.

It is still another object of the instant invention to provide an improved multi-wheel compactor roller comprising a plurality of wheels and having loading means for the wheels comprising a hydraulic cylinder and piston power means for each wheel, said hydraulic cylinder and piston means for the several wheels being connected to each other to equalize the pressure of the hydraulic fluid in the several hydraulic cylinder and piston means for uniformly loading each of the wheels.

A still further object of the instant invention is to provide an improved multi-wheel compactor roller having a plurality of axially aligned wheels which are individually adjustable in accordance with contours of the ground surface traversed by the wheels, and including stabilizing means for the roller adapted to lock an end wheel in position when the roller tilts in the direction of said end wheel.

A further object of the instant invention is to provide an improved multi-wheel compactor roller having a plurality of axially aligned wheels, each of said wheels being individually adjustable in accordance with the contours of the ground surface traversed by the wheels, and comprising hydraulic power means for loading each wheel in all positions thereof, and further including stabilizing means for the compactor roller which is responsive to lateral tilting of the roller, and is adapted to operate the hydraulic power means for an end wheel, to lock said end wheel in position when the roller tilts in the direction of said end wheel to thereby stabilize the roller.

Still another object of the instant invention is to provide an improved compactor roller comprising a main frame formed with a pair of bunkers adapted to contain ballast for weighting the roller, said bunkers being disposed one at each side of the roller, and spaced from each other, with the power plant and accessory mechanism therefor being supported on the main frame between the bunkers.

It is a further object of the instant invention to provide an improved compactor roller comprising a main frame formed with a pair of bunkers adapted to contain ballast for weighting the roller, with said bunkers being disposed one at each side of the roller, and including a power plant and accessory mechanism therefor which are assembled in a unit and supported as a unit on the main frame between the bunkers.

Other objects of the invention will appear hereinafter, the novel features and combinations being set forth in the appended claims.

In the accompanying drawings:

FIG. 3 is a rear elevational view of the compactor roller showing the rear wheels;

FIG. 4 is a sectional view of the rear of the compactor roller taken on the line 4—4 in FIG. 1;

FIG. 5 is a sectional view of the rear wheels of the compactor roller taken on the line 5—5 in FIG. 4;

FIG. 6 is a sectional view of the rear wheels of the compactor roller taken on the line 6—6 in FIG. 4;

FIG. 7 shows the sensor and control valve for the compactor roller stabilizing system;

FIG. 8 is a sectional view of the sensor and control valve taken on the line 8—8 in FIG. 7;

FIG. 9 is a sectional view of the sensor taken on the line 9—9 in FIG. 7;

FIGS. 11 and 12 show the stabilizing system control valve in two alternate positions thereof;

The instant invention relates to multi-wheel compactor rollers which comprise a plurality of wheels adapted to traverse a ground surface and to compact the material of the ground. The compactor roller comprises a main frame or a body which is formed with bunkers adapted to contain ballast in the form of rock or other dense material, which weights the compactor roller, whereby the wheels of the compactor roller are adapted to apply large forces to the ground as they are traversed over the surface thereof. The compactor roller of the instant invention is to be distinguished from conventional road rollers, which generally comprise large cylindrical rollers at the front and rear of the machine. These road rollers apply a linear load to the ground and are generally most useful in forming a smooth ground sufrace. However, when traversing a relatively uneven surface, the conventional road roller will bridge uneven portions of the ground surface, so that the force which is applied to the ground will not be uniform on all areas thereof, and the compacting force will not be uniformly distributed over the ground surface. This condition is alleviated by compactor rollers constructed in accordance with the instant invention, wherein there is provided a plurality of wheels, each of which is individually adjustable so that each of the wheels is always in contact with the ground surface and applies a compacting force thereto. The compactor roller of the instant invention further includes means for uniformly loading each wheel in all positions thereof, whereby the forces applied to the ground by the several wheels are equal for most efficient and uniform compaction of the material thereof.

Figure 1:
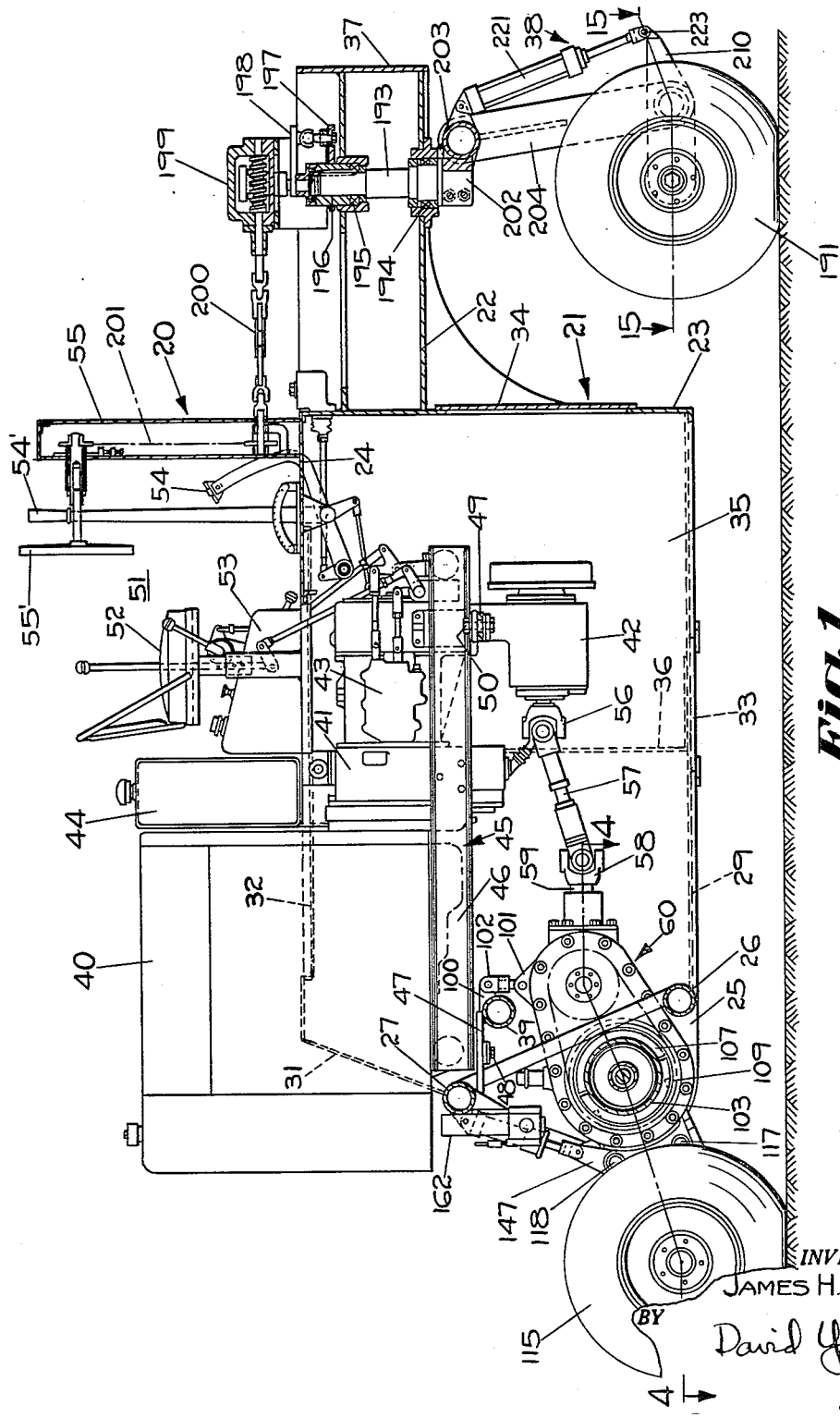
FIG. 1 is a side elevational view of the improved compactor roller of this invention, partially in section.
Figure 2:
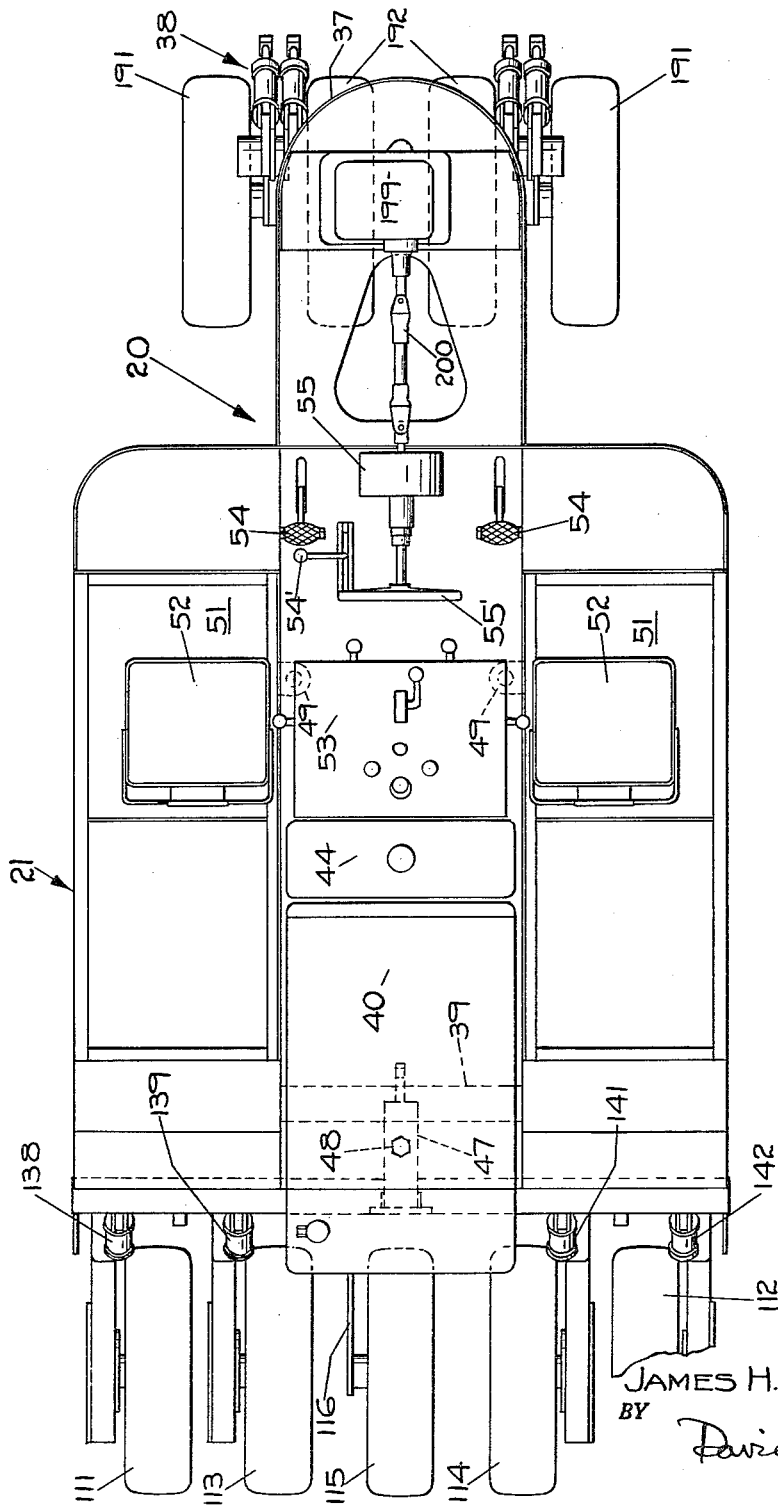
FIG. 2 is a plan view of the compactor roller.

Referring to the drawings, and particularly to FIGS. 1, 2 and 4 thereof, there is illustrated therein the compactor roller 20 of this invention. The compactor roller 20 comprises a main frame 21, which includes a plurality of plates 22 welded together in assembly to form the main frame 21. Near the front of the main frame 21 there is provided a transverse front plate 23 extending across the main frame 21, and extending from the bottom of the main frame 21 to the floor plate 24 at the top thereof. At each side of the main frame 21 there is a side plate 25 which extends from the bottom of the main frame 21 upwardly to the level of the floor plate 24. A tubular structural member 26 extends transversely between the opposite side plates 25 at the bottom of the latter, and near the rear of the main frame 21. A second tubular structural member 27 extends transversely between the side plates 25, at the rear of the main frame 21 and about midway up on the side plates 25. The main frame 21 further includes a pair of inner side plates 28, as best seen in FIG. 4, which are spaced inwardly a substantial distance from the side plates 25. The inner side plates 28 are substantially coextensive with the side plates 25, with the exception that the inner plates 28 do not extend rearwardly beyond a line intersecting the axes of the tubular structural members 26, 27. A bottom plate 29 extends between the side plate 25 and the inner side plate 28 at each side of the main frame 21. At the rear of the main frame 21 there is provided a plate 30 disposed at an angle, and which closes the area between the side plate 25 and the inner side plate 28 at each side of the main frame 21, and lies in a plane which includes the axes of the tubular structural members 26, 27. Above the rear plate 30 there is provided a second rear plate 31, disposed between the side plate 25 and the inner side plate 28 at each side of the main frame 21, and which extends upwardly from the upper tubular structural member 27 to the tops of the side plate 25 and the inner side plate 28. The top of the main frame 21 between the side plates 25, 28 is open providing an opening 32. The bottom plate 29 also includes an opening which is closed by a cover 33, and the front of the main frame 21 includes an access cover 34 closing an opening in the front plate 23.

It will be apparent from the foregoing description of the main frame 21 that there are formed therein two compartments one at each side of the main frame 21, each compartment being formed between the side plates 25, 28 at each side of the main frame 21. Each compartment constitutes a bunker 35 in which rock, or other dense material, may be loaded through the opening 32 for the purpose of weighting the compactor roller 20 during the operation thereof. A reinforcing plate 36 extends transversely between the inner side plate 28 and the side plate 25 in each bunker 35, and is secured thereto for the purpose of reinforcing the main frame 21. At the front of the main frame 21 there is provided a nose 37 formed of a plurality of plates, and extending forwardly from the front plate 23 to provide a support for the front wheel assembly 38 of the compactor roller 20.

At the rear of the main frame 21 there is provided a short tubular structural member 39 which extends transversely between the inner side plates 28, and is disposed almost directly above the lower tubular structural member 26. The member 39 is secured to the inner side plates 28 and forms an additional reinforcing element in the main frame 21 as well as a support for other elements of the compactor roller 20.

The compactor roller 20 is powered by a power plant 40 which may be an internal combustion engine of a conventional form with suitable accessory mechanisms, such as a torque convertor 41 delivering the power of the power plant 40 to a transmission 42 which includes change gears 43. A fuel tank 44 is mounted in front of the power plant 40 in assembly therewith. The power plant 40 and the accessory mechanisms consisting of the torque convertor 41, the transmission 42 and change gears 43, are secured in a unitary assembly on a base member 45, which comprises a pair of oppositely disposed channels 46. Thus, the power plant assembly is formed as a single unit which may be placed as such in the compactor roller 20, or removed therefrom in the same manner, as may be required.

The power plant assembly mounted on the base member 45 is supported on the main frame 21 between the bunkers 35, the base member 45 being located about midway down with respect to the height of the bunkers 35. At the rear of the main frame 21 a supporting plate 47 is secured to the top of the structural member 39 and the bottom of the structural member 27, and extends therebetween to provide a rear support for the base member 45. A suitable bolt 48 secures the base member 45 to the support plate 47, with appropriate vibration absorbing means being interposed between the base member 45 and the support plate 47. The front end of the base member 45 is secured at each side thereof to supporting lugs 49, which are secured to the inner side plates 28. Suitable bolts 50 secure the base member 45 to the lugs 49 at either side thereof, with appropriate vibration absorbing means being interposed in the mounting means for absorbing vibration of the power plant assembly.

At the top of the main frame 21 in front of the fuel tank 44, there is provided an operator's station 51 with two seats 52 for the operator, disposed one at each side of the main frame 21 above the bunkers 35. At the operator's station 51, between the seats 52, there is an instrument panel 53 with conventional controls for the power plant 40 and its accessory mechanisms. There is also provided a pair of foot brakes 54, located one at each side of the operator's station 51 so as to be accessible from either operator's seat 52, and a hand brake 54'. At the front of the operator's station 51 there is formed an upright post 55 at the top of which there is provided a steering wheel 55' which is adapted to actuate a steering mechanism for the front wheel assembly 38, which will be described in greater detail hereinafter.

The transmission 42 delivers power to a universal coupling 56, which is connected to a universal shaft 57, the opposite end of which is connected to a second universal coupling 58. The universal coupling 58 is secured to the end of a driven power shaft 59, as best seen in FIG. 4, the shaft 59 being adapted to drive a differential gearing system 60 enclosed within a differential housing 61. The driven power shaft 59 is rotatably supported in the differential housing 61 by suitable antifriction bearing means 62. A bevel pinion 63 is secured to the end of the driven power shaft 59 within the differential housing 61 and meshes with a driven bevel gear 64. The driven bevel gear 64 includes a driven gear housing 65, and is rotatably mounted within the differential housing 61 by suitable antifriction bearing means 66. A pin 67 in the driven gear housing 65 rotatably connects the differential pinion 68 to the driven gear housing 65, and the driven bevel gear 64 drives the differential pinion 68. Oppositely disposed differential gears 69, 70 mesh with the differential pinion 68 and are driven thereby.

A shaft 71 is keyed to the differential gear 69 and is rotatably supported in the driven gear housing 65, and extends beyond the driven gear housing 65 into the side wall 72 of the differential housing 61, in which it is supported by suitable antifriction bearing means 73. At the opposite side, a shaft 74 is keyed to the differential gear 70 and extends beyond the driven gear housing 65 into the side wall 75 of the differential housing 61, in which the end of the shaft 74 is supported by suitable antifriction bearing means 76. Each shaft 71, 74 has secured thereto a sprocket 77. The sprockets 77 being identical in construction and function, only one will be described in further detail. It will be apparent, however, that the differential gears 69, 70 which rotate the sprockets 77 through the shafts 71, 74, respectively, drive the sprockets 77 at different speeds where required, in accordance with the conventional operation of a differential gearing system. A drive chain 78 is engaged with the teeth of the sprocket 77, and the drive chain 78 is also engaged with the teeth of a driven sprocket 79, which is aligned with the sprocket 77. The sprocket 79 is secured, as by welding, to a tubular shaft 80 which extends laterally from the differential housing 61. At the outboard end of the tubular shaft 80 there is secured a drive sprocket 81 from which the final drive is delivered, as will be described in greater detail.

A drive sprocket 82 is secured to the driven gear 64 by a plurality of bolts 83, and a drive chain 84 is engaged with the teeth of the sprocket 82. A driven sprocket 85 is aligned with the sprocket 82, and the chain 84 is trained about the driven sprocket 85 in engagement with the teeth thereof to drive the sprocket 85. The gear ratios of the sprockets 82, 85 and sprockets 77, 79 are equal, whereby the speeds of these drives will be the same.

The driven sprocket 85 is secured by a plurality of bolts 86 to a driven housing 87 which is rotatably mounted in the differential housing 61 by suitable antifriction bearing means 88. A pin 89 in the driven housing 87 rotatably secures a differential pinion 90 to the housing 87, whereby the differential pinion 90 is driven by the driven sprocket 85 through the driven housing 87. The differential pinion 90 is engaged with oppositely disposed differential gears 91, 92 which are disposed within the driven housing 87. A shaft 93 is keyed to the differential gear 91 and is rotatably supported in the driven housing 87, and a similar shaft 94 is keyed to the differential gear 92 and is also rotatably supported in the driven housing 87. The shafts 93, 94 are identical, except that they extend in opposite directions from the driven housing 87, and therefore, only one will be described in further detail. The shaft 94 is rotatably supported within the tubular shaft 80 by a suitable antifriction bearing 95 which is interposed between the shaft 94 and the tubular shaft 80, in alignment with the driven sprocket 79. The shaft 94 is further supported within the tubular shaft 80 by a suitable antifriction bearing 96 which is interposed between the shaft 94 and the tubular shaft 80 in alignment with the drive sprocket 81. The outboard end of the shaft 94 is rotatably supported in an end plate 97 by a suitable antifriction bearing 98. A drive sprocket 99 is secured to the end of the shaft 94, and the final drive is delivered from the drive sprocket 99.

A forwardly extending lug 100 is secured to the structural member 39, and a lug 101 is secured to the top of the differential housing 61 near the front thereof. A short link 102 is connected between the lugs 100, 101 and supports one end of the differential housing 61 from the structural member 39. As best seen in FIG. 4, the differential housing 61 is disposed between the bunkers 35 at the rear of the compactor roller 20 below the power plant 40. The shafts 80, 93, 94 extend laterally outwardly from the rear of the differential housing 61 to opposite sides thereof. The shafts 80, 93, 94 and the drive sprockets 81, 99, which are secured thereto, are enclosed within a tubular housing 103 at each side of the differential housing 61, with the tubular housing 103 being disposed behind the bunkers 35. Each tubular housing 103 includes a collar 104 at its inner end by which the tubular housing 103 is secured to the differential housing 61 by bolts 105, the tubular housing 103 being disposed concentrically with the shafts 80, 93, 94.

The main frame 21 includes a structural brace 106 which is secured to the transverse structural members 26, 27 and is disposed at an angle. One such structural brace 106 is provided at each side of the differential housing 61. One half 107′ of a ring clamp 107 is secured, as by welding, to each structural brace 106 and faces rearwardly to form a seat for the reception of the tubular housing 103. The other half 107″ of the ring clamp 107 is placed on the other side of the tubular housing 103 opposite the ring clamp half 107′, and a pair of bolts 108 are threaded through the ring clamp half 107″ into the ring clamp half 107′ to secure the ring clamp halves 107′, 107″ to each other and to hold the tubular housing 103 in position attached to the rear end of the main frame 21 (FIG. 5). Since the tubular housing 103 is secured to the differential housing 61, the ring clamp 107 also serves to support the differential housing 61 on the rear end of the main frame 21. A second similar ring clamp 109 is provided behind the bunker 35, and the ring clamp 109 is secured to the rear plate 30 of the bunker 35, in alignment with a structural brace 110 which is secured to the rear plate 30 on the inner side thereof, extending between the transverse structural members 26, 27. The ring clamp 109 is identical in construction to the ring clamp 107, and provides an additional support for the tubular housing 103.

The rear of the compactor roller 20 includes five axially aligned compacting wheels consisting of two outer driven wheels 111, 112, two inner driven wheels 113, 114 and a center idle wheel 115, as best seen in FIG. 3. The center idle wheel 115 is disposed behind the differential housing 61, and is rotatably mounted, with conventional support and bearing means, at the end of an arm 116. The inner end of the arm 116 is secured to laterally extending pins 117, 118 (FIG. 1), which are secured to a two-part ring bearing member 119. The two-part ring bearing member 119 is disposed on the tubular housing 103, as seen in FIG. 4, with the two-part ring bearing member 119 being disposed on opposite sides of the ring clamp 107. The two-part ring bearing member 119 is suitably formed with a bearing liner so as to be rotatable on the fixed tubular housing 103 on which it is supported. Thus, the idle wheel 115 is floatingly supported on the tubular housing 103 and may swing upwardly and downwardly with respect thereto on the axis of the tubular housing 103.

The inner driven wheels 113, 114 are similar in construction with the exception that they are oppositely disposed, as seen in FIGS. 3 and 4, as are also the outer driven wheels 111, 112, and therefore, the description will proceed as to the driven wheels 112, 114, it being understood that the following description applies equally to the driven wheels 111, 113. The outer driven wheel 112 and its associated driving and supporting structure is disposed laterally beyond the ring clamp 109. Surrounding the housing 103 there is provided a tubular shell 120 to the opposite ends of which there are secured ring bearing members 121, 122, which support the tubular shell 120 on the housing 103 for rotation with respect to the latter. A hollow arm 123, formed of plate elements, is secured to the tubular shell 120 and extends rearwardly therefrom. An opening 124 in the tubular shell 120, and an opening 125 in the housing 103, are aligned with the hollow arm 123 and provide access thereto. At the outboard end of the hollow arm 123 there is provided a supporting sleeve 126 secured thereto, and which extend laterally from the arm 123. A stub shaft 127 is rotatably supported by suitable antifriction bearings 128, 129 within the sleeve 126. The driven wheel 112 is secured to the outer end of the shaft 127. A sprocket 130 is secured to the inner end of the shaft 127 and a drive chain 131 engages with the teeth of the sprockets 99, 131 and is trained thereabout to deliver the drive from the shaft 94 to the driven wheel 112. From the foregoing it will be understood that the outer driven wheel 112 is floatingly supported by the arm 123 on the housing 103 by means of the shell 120 and the ring bearings 121, 122, whereby the wheel 112 may swing upwardly and downwardly with the axis of the tubular housing 103 as a center.

The inner driven wheel 114 is supported between the ring clamps 107, 109 on the tubular housing 103. There is provided for this purpose a tubular shell 132 which has secured to the opposite ends thereof ring bearing members 133, 134, the latter being disposed in bearing engagement with the tubular housing 103, and rotatably supporting the tubular shell 132 on the housing 103. A hollow arm 135 is secured to the tubular shell 132, the latter being formed with an opening 136, and the tubular housing 103 including an opening 137, which openings 136, 137 are aligned with the hollow arm 135 to provide access thereto for the drive chain 131, which delivers the drive from the sprocket 81 to the inner driven wheel 114. The structure for mounting the inner driven wheel 114 on the end of the arm 135 is identical to the corresponding structure for mounting the outer driven wheel 112 on the end of the arm 123, and therefore, is not described in further detail. It will be understood that the inner driven wheel 114 is also floatingly mounted on the tubular housing 103 through the arm 135 and the tubular shell 132, whereby the wheel 114 may swing upwardly and downwardly with the axis of the tubular housing 103 as a center.

Each of the rear wheels 111-115 is independently supported at the rear of the compactor roller 20 on the tubular housing 103, and the supporting means for each of the rear wheels 111-115 pivotally supports the wheels 111-115 on the peripheral surface of the tubular housing 103 so that each of the wheels 111-115 is adapted to swing upwardly and downwardly independently of any of the other wheels 111-115, about a common axis which is the common axis of the tubular housing 103 and the drive shafts 80, 93, 94. Thus, the wheels 111-115 may be disposed in axially aligned position, or they may take random positions with respect to each other, which correspond to irregularities in the contour of the ground surface on which the wheels are disposed, or over which the wheels are traversed. Thus, during the operation of the compactor roller 20 each of the rear wheels 111-115 is at all times in full contact with the ground, and will apply a compacting force to the ground so that there is produced a uniform compaction of the ground material.

Referring particularly to FIGS. 3, 5 and 6, there is provided a hydraulic cylinder and piston mechanism 138-142 for the rear wheels 111-115, respectively, for loading each of the rear wheels 111-115. Five anchors 143 (FIG. 5) are secured at spaced positions to the tubular structural member 27, extending rearwardly therefrom, one anchor 143 being provided for each cylinder and piston mechanism 138-142. A pivot pin 144 secures one cylinder and piston mechanism 138-142 to each anchor 143. Each of the hollow arms 123, 135 includes a lug 145 to which the piston rod end of the cylinder and piston mechanisms 138, 139, 140, 141 is connected by a pivot pin 146. The piston end of the cylinder and piston mechanism 142 for the center idle wheel 115 is connected by a link 147 to the arm 116 and to the bearing member 119. The link 147 is pivotally secured to the pin 118, and the piston end of the cylinder and piston mechanism 142 is secured to the link 147 by a pin 148. Thus, it is seen that each of the rear wheels 111-115 has an individual power means in the form of hydraulic cylinder and piston mechanisms 138-142, respectively, by which the rear wheels are loaded. This is accomplished by the application of hydraulic pressure to the cylinder and piston mechanisms 138-142 with the force thereof being transmitted to the arms 116, 123, 135 at the ends of which the rear wheels 111-115 are mounted. This is described in greater detail hereinafter.

Figure 10:
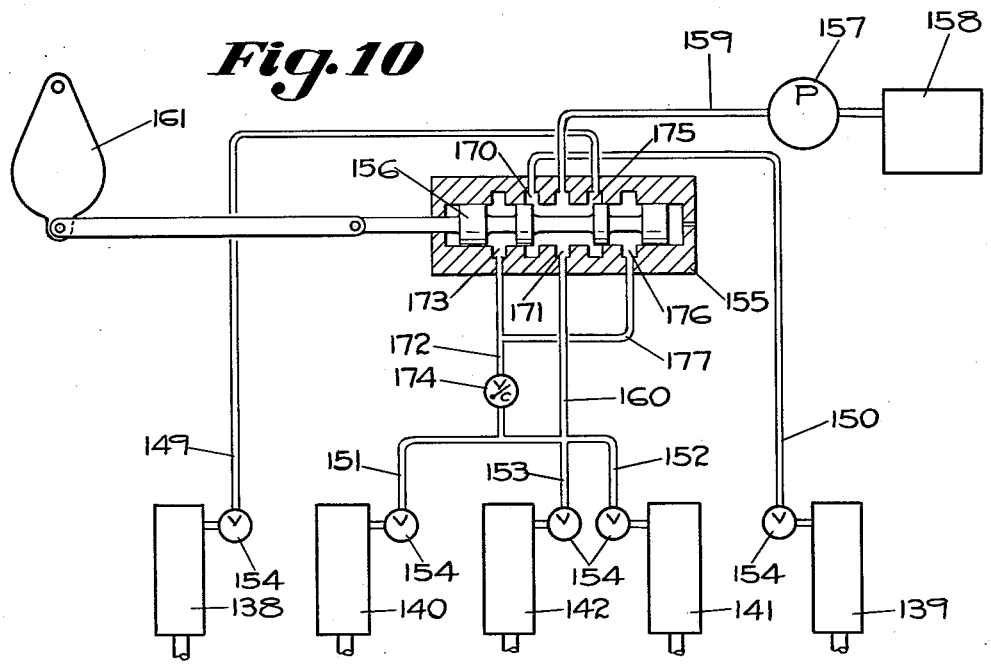
FIG. 10 is a diagrammatic illustration of the hydraulic circuit for the rear wheels of the compactor roller including the stabilizing system.

FIG. 10 is a diagrammatic illustration of the hydraulic circuit for the several cylinder and piston mechanisms 138-142. The hydraulic lines 149-153 leading to the cylinder and piston mechanisms 138-142, respectively, each includes a valve 154 which may be manually opened or closed. When hydraulic pressure is applied to the cylinder and piston mechanisms 138-142 the valves 154 may all be closed, thereby maintaining the pressure in the hydraulic cylinder and piston mechanisms 138-142, and locking the wheels 111-115 in position as determined by the force applied through the cylinder and piston mechanisms 138-142. Thus, when it is desired to lock the rear wheels 111-115 in axially aligned positions the compactor roller 20 may be located on a level surface and pressure applied to the cylinder and piston mechanisms 138-142 to adjust the wheels by swinging movement thereof to the desired position with respect to the rear end of the main frame 21, and thereafter each of the valves 154 is manually closed thereby fixing the position of the rear wheels 111-115 and effectively locking them in this fixed position.

The hydraulic circuit illustrated in FIG. 10 further includes a valve 155 having a reciprocable spool 156 which governs the operation of the valve 155. As seen in FIG. 10, the spool 156 is in its normal position in the valve 155, being centrally disposed therein. Pump 157 delivers hydraulic fluid under pressure from reservoir tank 158 through hydraulic line 159 to the valve 155. The hydraulic fluid is delivered from the valve 155 to the cylinder and piston mechanisms 138, 139 through the hydraulic lines 149, 151, respectively. Hydraulic line 160 delivers the hydraulic fluid under pressure from the valve 155 to each of the hydraulic cylinder and piston mechanisms 140, 141, 142 through the hydraulic lines 151, 152, 153, respectively. It is thus seen that the valve 155 with the spool 156 in its normal position connects each of the hydraulic lines 149-153 to each other as well as to the hydraulic line 159 through which the pump 157 delivers the hydraulic fluid under pressure.

Under normal conditions the pressure applied to each of the cylinder and piston mechanisms 138-142 will be equal, since the hydraulic lines 149-153 are connected to each other. In the operation of the compactor roller 20 the rear wheels 111-115 may traverse an uneven ground surface in which there may be one or more high spots, as a result of which one or more of the rear wheels 111-115 will lose contact with the ground. Under this condition, assuming that only the wheels 111, 114 are in contact with the ground, the total force of the separate pressures applied to the several cylinder and piston mechanisms 138-142 will then be concentrated only in the cylinder and piston mechanisms 138, 141, whereby the pressure of the hydraulic fluid in the cylinder and piston mechanism 138, 141 will be increased above the supply pressure of the pump 157. Since each of the cylinder and piston mechanisms 138-142 is in communication with each other through the valve 155, the increased pressure in the cylinder and piston mechanisms 138, 141 will immediately be transmitted among the several cylinder and piston mechanisms 138-142, and the pressure in the cylinder and piston mechanisms 138-142 will again become uniform and will equalize at the supply pressure of the pump 157. This distribution of the hydraulic pressure to achieve equalization will be accompanied by a flow of hydraulic fluid from the cylinder and piston mechanisms 138, 141 to the cylinder and piston mechanisms 139, 140, 142, and will produce a repositioning of the rear wheels 111-115, as a result of which the wheels 111-115 will not be disposed in axial alignment, but rather will assume random positions with respect to each other, which positions correspond to the irregular contours of the ground surface over which the rear wheels 111-115 are traversed. It will be understood that in this condition each of the wheels 111-115 is loaded in accordance with the hydraulic pressure supplied to the several cylinder and piston mechanisms 138–142 by the pump 157.

The hydraulic circuit for the rear wheels, 111–115, as illustrated in FIG. 10, further includes a stabilizing system which becomes operative when the compactor roller 20 tilts to one side or the other, and the stabilizing system is operative to control or limit the tilting movement of the compactor roller 20 to prevent it from rolling over on its side. The stabilizing system, best seen in FIGS. 7, 8, and 9, comprises a sensor 161 in the form of a weighted pendulum type device having a general tear drop configuration. The sensor 161 is mounted within a housing 162 that is secured to the transverse structural member 27 at the rear of the main frame 21. The sensor 161 is pivotally mounted on a pivot pin 163, which is fixedly secured in the walls of the housing 162 at the top thereof. Thus the sensor 161 is free to swing laterally within the housing 162, and should the compactor roller 20 tilt to one side or the other in traversing an irregular ground surface, the sensor 161 will swing in the direction of tilt of the compactor roller 20, since the sensor 161, being freely suspended, will at all times seek a vertical position. The bottom of the sensor 161 is formed with a depending lug 164 to which there is secured a pivot pin 165, as best seen in FIG. 8. A short link 166 is pivotally secured at one end to the pivot pin 165, and includes an opposite bifurcated end 167 within which there is disposed an operating rod 168 which forms an extension of the spool 156 of the valve 155. The operating rod 168 is pivotally connected by a pivot pin 169 to the bifurcated end 167 of the link 166. Considering the rear view of the compactor roller, as seen in FIG. 3, when the compactor roller 20 tilts to the right, the sensor 161 will swing to the right relative to its housing 162, and will thereby reciprocate the spool 156 to the right in the valve 155, as illustrated in FIG. 11. Similarly, when the compactor roller 20 tilts to the left, as viewed in FIG. 3, the sensor 161 will swing to the left, reciprocating the spool 156 to the left in the valve 155, as seen in FIG. 12.

Referring now to FIGS. 10, 11 and 12, the operation of the stabilizing system will be explained. When the compactor roller 20 tilts to the right, the right side of the compactor roller 20, as viewed from the rear, is the low side. Thus, it is desired to prevent the outer driven wheel 112 at the right side of the compactor roller 20 from raising since this could create a tendency for the compactor roller 20 to tilt still further toward the right, and possibily to roll over. Stated another way, when the compactor roller 20 tilts to the right, it is desired that the outer driven wheel 112 be maintained as low as possible with respect to the main frame 21, in order to keep the right side of the compactor roller 20 up, which would counteract the tendency of the compactor roller to roll over.

When the sensor 161 swings to the right due to right tilting of the compactor roller 20, the spool 156 is shifted to the right, as seen in FIG. 11. In this condition the spool 156 seals the valve port 170 from the valve port 171 so that, in effect, the cylinder and piston mechanism 139 is cut off from communication with the pump 157, and also from the cylinder and piston mechanisms 138, 140, 141, 142. Thus, there cannot be a flow of hydraulic fluid from the cylinder and piston mechanism 139 to any of the cylinder and piston mechanisms 138, 140, 141, 142. Thus, the outer driven wheel 112 at the right side of the compactor roller 20 cannot raise with respect to the main frame 21, which serves to prevent further tilting of the compactor roller 20 to the right, in accordance with the stated purpose of the stabilizing system.

However, provision is made for the flow of additional hydraulic fluid into the cylinder and piston mechanism 139, it being understood that the addition of hydraulic fluid to the cylinder and piston mechanism 139 will further lower the outer driven wheel 112, and tend to raise the right side of the compactor roller 20 counteracting the tendency of the compactor roller 20 to tilt to the right. The hydraulic line 172 is blocked from the port 170 which directs hydraulic fluid through the line 150 to the cylinder and piston mechanism 142. However, when the spool 156 is shifted to the right, as seen in FIG. 11, the line 172 is connected through port 173 to port 170, which communicates with the hydraulic cylinder and piston mechanism 139. The line 172 includes a one-way check valve 174 which permits the flow of hydraulic fluid through line 172 towards the cylinder and piston mechanism 139, but blocks any flow of hydraulic fluid from the hydraulic cylinder and piston mechanism 139. The hydraulic lines 151, 153, 152 which lead from the cylinder and piston mechanisms 140, 142, 141, respectively, are directly connected to the line 172, and the line 149 from the cylinder and piston mechanism 138 is connected to the line 172 through the valve 155 and the line 160. Thus, while the compactor roller 20 is operating in a tilted to the right position, should any of the rear wheels, 111, 113, 114, 115 encounter a high spot relative to the ground traversed by the other wheels of this group of wheels, there will be an increase of hydraulic pressure in the cylinder and piston mechanism for that wheel which is on the high spot. If this increased pressure exceeds the pressure in the hydraulic cylinder and piston mechanism 139 there will be a flow of hydraulic fluid through the check valve 174 to the cylinder and piston mechanism 139, as well as to the other cylinder and piston mechanisms 138, 140, 141, 142. This action, as respects the outer driven wheel 112, will have the effect of lowering that wheel with respect to the main frame 21, thus further counteracting the tendency of the compactor roller 20 to tilt to the right.

In FIG. 12 the valve 155 is illustrated with the spool 156 reciprocated to the left, as will occur when the compactor roller 20 tilts to the left during the operation thereof. In this condition of operation the port 175 which is in communication with the cylinder and piston mechanism 138 at the left side of the compactor roller 20 is sealed from the port 171, and the port 176 is in communication with the port 175. Hydraulic line 177 connects to the hydraulic line 172 and the check valve 174, whereby the cylinder and piston mechanism 138 is connected to the hydraulic line 172. The operation of the stabilizing system as respects cylinder and piston mechanism 138 is identical to that above described with respect to the cylinder and piston mechanism 142, and it operative as above described to counteract or limit tilting of the compactor roller 20 to the left.

Figure 13:
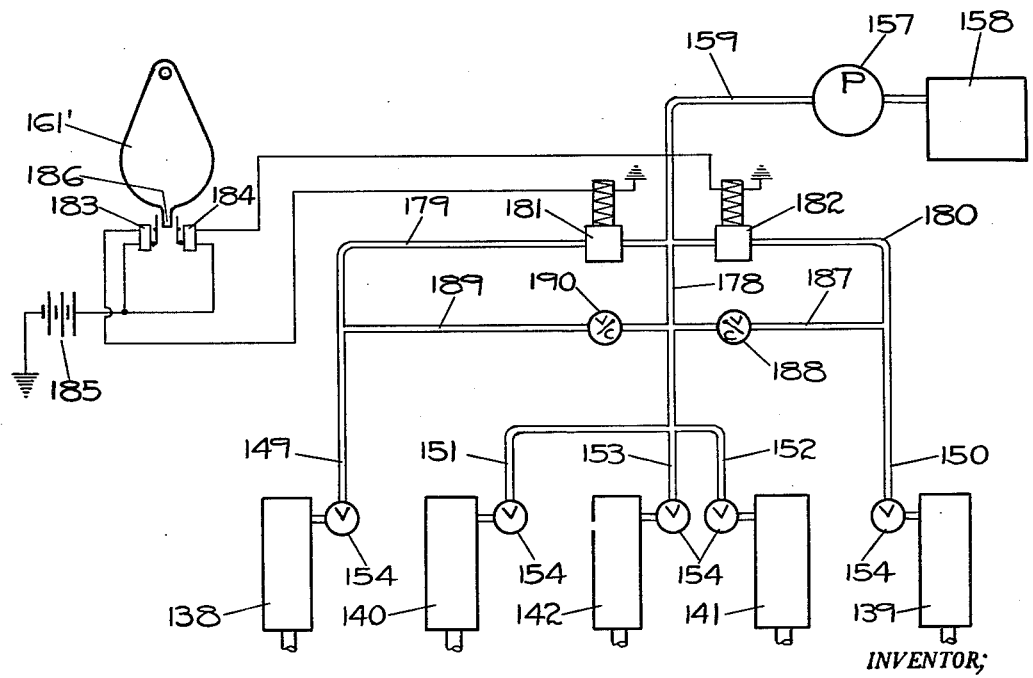
FIG. 13 is a diagrammatic illustration of the hydraulic circuit for the rear wheels of the compactor roller including a modified stabilizing system.

In FIG. 13 there is illustrated an alternate form of the hydraulic system illustrated in FIG. 10, with the modifications therein being limited to the stabilizing system, and accordingly, like parts in the two hydraulic systems are designated by the same reference numerals. The stabilizing system illustrated in FIG. 10 may be considered to be a mechanical arrangement, while the stabilizing system included in the hydraulic circuit illustrated in FIG. 13 may, for purposes of distinction, be considered to be an electrical system.

In the hydraulic system of FIG. 13 the pump 157 delivers hydraulic fluid under pressure from the tank 158 through line 159 and line 178 directly to the lines 151, 152, 153 for the center cylinder and piston mechanisms 140, 141, 142. The hydraulic line 159 connects to hydraulic lines 179, 180 through which hydraulic fluid is delivered to lines 149, 150, respectively, for the cylinder and piston mechanisms 138, 139, respectively. The hydraulic lines 179, 180 include solenoid valves 181, 182, respectively. The solenoid valves 181, 182 are normally held open to permit free flow of hydraulic fluid through the hydraulic lines 179, 180. Thus, it is apparent that the several hydraulic cylinder and piston mechanisms 138–142 are in hydraulic communication with each other, whereby there may be unimpeded flow of fluid between the several cylinder and piston mechanisms 138–142 as described in connection with the hydraulic circuit illustrated in FIG. 10.

The solenoid valve 181 is in circuit with a normally closed limit switch 183, and the solenoid valve 182 is in similar circuit with a normally closed limit switch 184. Power is supplied to the electrical circuit from a battery 185. The sensor 161' is formed with a depending arm 186 which is arranged to actuate one or the other of the limit switches 183, 184 when the sensor 161 swings laterally in accordance with the lateral tilting of the compactor roller 20, as previously described. Thus, when the compactor roller 20 tilts laterally to the right the depending arm 186 of the sensor 161 will contact the limit switch 184, opening that switch and releasing the solenoid valve 182 to close hydraulic line 180. Thus, there can be no flow of hydraulic fluid to or from the cylinder and piston mechanism 139 through the hydraulic line 180. There is provided in the hydraulic circuit a bypass line 187 connected to the cylinder and piston mechanism 139 through line 150. The bypass line 187 includes a one-way check valve 188 which permits the flow of hydraulic fluid to the cylinder and piston mechanism 139 through lines 187, 153, but blocks any flow of hydraulic fluid from the cylinder and piston mechanism 139. The left side of the hydraulic circuit similarly includes a bypass line 189 for the cylinder and piston mechanism 138, which includes a one-way check valve 190 operating in the same manner as respects the cylinder and piston mechanism 138, as previously described with respect to check valve 188 for the cylinder and piston mechanism 139. Thus, it is seen that the alternate electrical stabilizing system illustrated in FIG. 13 operates in the same manner as the mechanical stabilizing system of FIG. 10 to counteract or limit lateral tilting of the compactor roller 20, and thereby have a stabilizing effect thereon.

Figure 14:
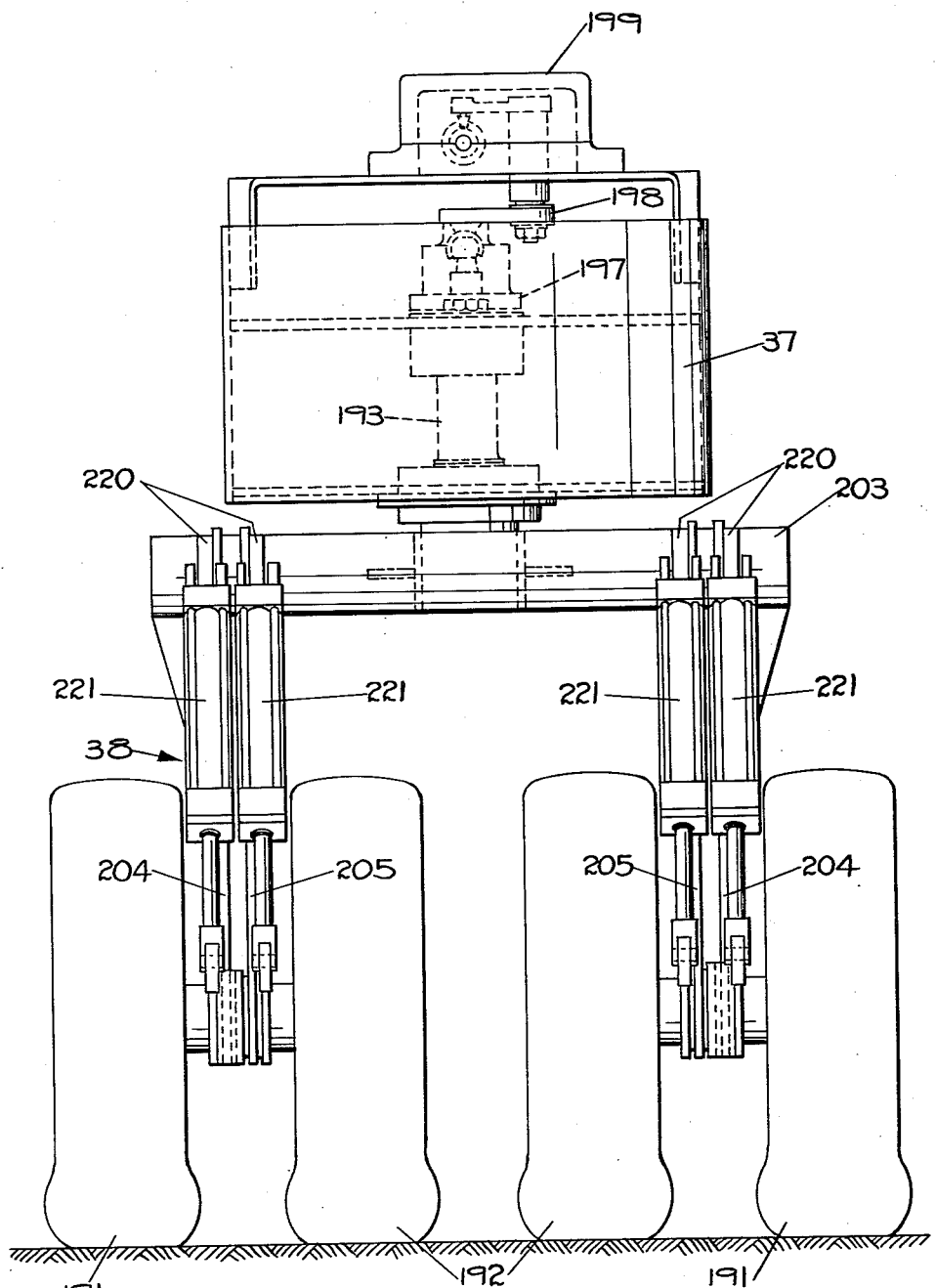
FIG. 14 is a front elevational view of the front wheels of the compactor roller.

The front wheel assembly 38 comprises two identical pairs of wheels 191, 192, only one of which will be described in detail. As best seen in FIGS. 2 and 14, there are four front wheels 191, 192, arranged in two pairs and these are alternately disposed with respect to the five rear wheels 111–115, so that in traversing the compactor roller 20 over a ground surface all portions of that surface within the width of coverage of the rear wheels 111–115 will be compacted.

The front wheel assembly 38 is supported by a king pin 193 which is rotatably mounted in the nose 37 of the main frame 21 in an upright position by suitable bearings 194, 195 (FIG. 1). Keyed to the top of the king pin 193 is a collar 196 which secures the king pin 193 in assembly on the nose 37 of the main frame 21. The collar 196 has secured thereto a forwardly extending crank 197, which is actuated by an operator 198 forming a part of a steering gear 199. The steering gear 199 is actuated by a rotatable connecting link 200 which extends between the post 55 and the steering gear 199. A drive chain 201 connects the steering wheel 56 to the connecting link 200 for rotating the latter and operating the steering gear 199 to steer the two pairs of front wheels 191, 192.

A clamp 202 is secured to the lower end of the king pin 193 below the nose 37, and a transverse tubular beam 203 is secured to the clamp 202 as by welding so as to be rigid therewith. Each pair of wheels 191, 192 is supported from one end of the tubular beam 203, and the structure of each pair of wheels is identical, wherefore only one pair of the wheels 191, 192 will be described in further detail. A pair of spaced legs 204, 205 are secured to the beam 203, as by welding, and depend therefrom. The lower end of each leg 204, 205 is formed with a circular bore 206 within which there is disposed a bearing liner 207. A journal 208 fits within the bearings 207 of the legs 204, 205. The journal 208 is rotatably supported by the bearing liners 207 in the bores 206 of the legs 204, 205.

Figure 15:
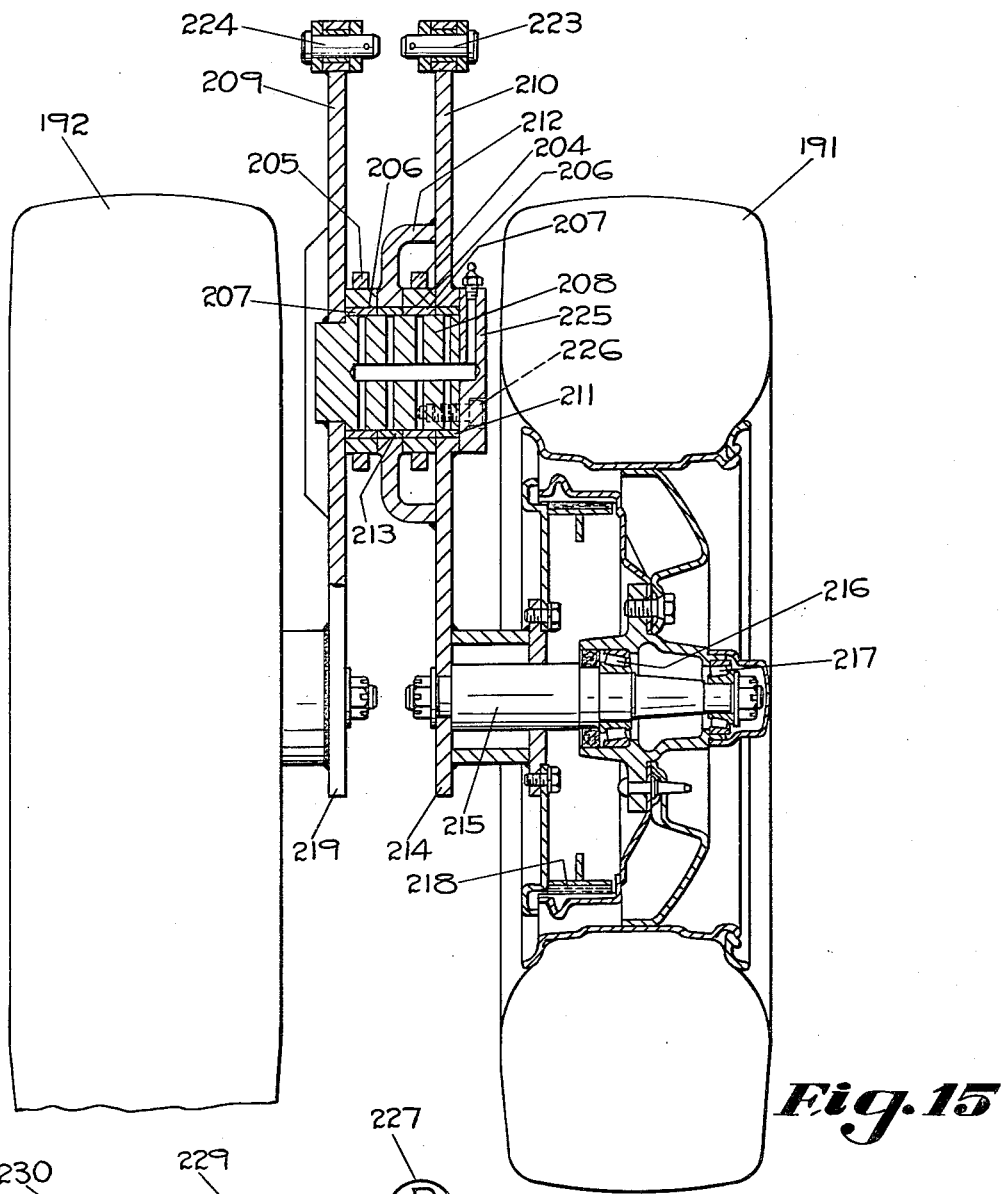
FIG. 15 is a plan view, partially in section, of the front wheels of the compactor roller taken on the line 15—15 in FIG. 1.

A wheel supporting arm 209 is secured to one end of the journal 208, as by welding, and abuts a portion of the leg 205, as seen in FIG. 15. A second wheel supporting arm 210 is supported on the journal 208 and includes a bearing liner 211, mounting the arm 210 on the journal 208 for rotation relatively thereto, and relatively to the first wheel supporting arm 209. The wheel supporting arm 210 includes an auxiliary supporting bracket 212, which extends laterally to between the legs 204, 205, and the supporting bracket 212 also includes a bearing liner 213 which fits on the journal 208 and provides additional support for the arm 210 on the journal 208. The journal 208 is secured in the front wheel assembly 38 by an end plate 225, which is secured to the journal 208 by a plurality of bolts 226. The end plate 225 abuts the arm 210. In the front wheel assembly 38 the legs 204, 205 are fixed, and the journal 208 and the wheel supporting arm 209 are rotatable together relatively to the fixed legs 204, 205. The wheel supporting arm 209 and the journal 208 are also rotatable together relatively to the wheel supporting arm 210, and the latter is rotatable relatively to the fixed legs 204, 205, and to the wheel supporting arm 209. More simply stated, the wheel supporting arms 209, 210 are independently and relatively rotatable on the axis of the journal 208.

The inner end 214 of the arm 210 has fixedly secured thereto a shaft 215 which extends laterally therefrom. The wheel 191 is secured to the end of the shaft 215 on suitable antifriction bearings 216, 217 which permit free rotation of the wheel 191 on the shaft 215. The wheel assembly includes a brake 218, which may be of a conventional form, and is operated from the brake pedals 54 or the hand brake 54'. The wheel 192 is assembled on the end 219 of the wheel supporting arm 209 in the same manner as the wheel 191, and therefore is not described in any further detail. Four anchors 220 are secured at laterally spaced positions to the transverse tubular beam 203 and extend forwardly therefrom. To each anchor 220 there is secured a cylinder and piston mechanism 221 by means of a pivot pin 222. The piston rod end of a cylinder and piston mechanism 221 is connected to a wheel supporting arm 210 by means of a pivot pin 223. Similarly, a cylinder and piston mechanism 221 is connected to the forwardly extending portion of each wheel supporting arm 209 by a pivot pin 224. Thus, it is seen that each of the four wheels 191, 192 is independently floatingly supported by the wheel supporting arms 209, 210 on a single axis coincident with the axis of the journals 208, and therefore, the wheels 191, 192 may swing upwardly and downwardly about this axis, which will cause the wheels 191, 192 to raise or lower with respect to the main frame 21.

Figure 16:
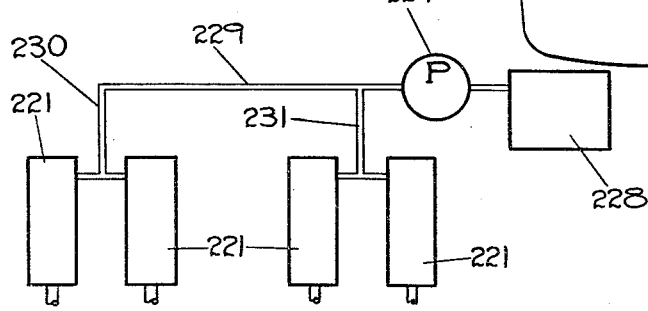
FIG. 16 is a diagrammatic illustration of the hydraulic circuit for the front wheels of the compactor roller.

In FIG. 16 there is a diagrammatic illustration of the hydraulic system for the cylinder and piston mechanisms 221 of the front wheel assembly 38. The pump 227 supplies hydraulic fluid under pressure from the reservoir tank 228 to each of the cylinder and piston mechanisms 221 through hydraulic lines 229, 230, 231 for the purpose of initially fixing the position of the front wheels 191, 192 and loading the front wheels 191, 192. Since the cylinder and piston mechanisms 221 are connected to each other through hydraulic lines 229, 230, 231, there will be a uniform hydraulic pressure applied to each of these, and the front wheels 191, 192 will be uniformly loaded thereby. Should one or several of the front wheels 191, 192 encounter a high spot in the ground surface being traversed, then these wheels will be overloaded causing a momentary increase of pressure of the hydraulic fluid in the cylinder and piston mechanisms 221 for the overloaded wheels. This increased pressure in the cylinder and piston mechanisms 221 will be immediately relieved by the flow of hydraulic fluid between the several hydraulic cylinder and piston mechanisms 221, to equalize the hydraulic pressure in the several hydraulic cylinder and piston mechanisms 221, so that each of the front wheels 191, 192 will again be equally loaded. It will be understood that as part of this equalizing action the wheels 191, 192 will automatically adjust their positions in accordance with the contours of the ground surface being traversed, and will correspond in position to the contour of the ground being traversed, so that each of the wheels 191, 192 will be in full loaded contact with the ground surface and will operate to uniformly compact the ground material.

By the instant invention there is provided a multi-wheel compactor roller comprising a plurality of compacting wheels disposed in two groups at the front and rear ends of the compactor roller. Each of the wheels of the compactor roller is mounted on the machine for independent swinging movement upwardly and downwardly, whereby each of the wheels is in contact with the ground surface at all times. Each of the wheels is provided with an independent means in the form of a cylinder and piston hydraulic power mechanism for loading each wheel in all positions thereof. The cylinder and piston hydraulic power mechanism for the rear wheels and for the front wheels, respectively, of the compactor roller are hydraulically interconnected so that the hydraulic pressure of the several hydraulic cylinder and piston mechanisms will be equal for uniformly loading the compacting wheels in all positions thereof. The hydraulic system for loading the rear wheels of the compactor roller further includes a stabilizing system, which is responsive to lateral tilting of the compactor roller and operates to limit or to counteract lateral tilting of the compactor roller to prevent the machine from rolling over on its side.

Obviously those skilled in the art may make various changes in the details and arrangement of parts without departing from the spirit and scope of the invention as defined by the claims hereto appended, and applicant therefore wishes not to be restricted to the precise construction herein disclosed.

Having thus described and shown an embodiment of the invention, what it is desired to secure by Letters Patent of the United States is:

1. A multi-wheel compactor roller comprising a main frame, a group of compacting wheels adapted to traverse a ground surface for compacting the material thereof, means mounting said group of compacting wheels on the main frame, said mounting means including an individual support for each wheel independently supporting the wheel, means mounting each individual support for adjustment in an upright plane for raising and lowering each wheel to conform the several wheels of the group of compacting wheels to the contour of the ground surface traversed by the wheels, an individual loading device for each individual support and its respective wheel for transmitting force to the wheel to load the wheel, means connecting each individual loading device between the main frame and its respective support, and force transmitting means connecting the respective loading devices to each other and operative in response to the raising and lowering of any of the wheels relatively to each other to transmit force from any of said loading devices to any other of said loading devices to equally load each wheel in all positions of the wheels relatively to each other during traverse of a ground surface by the wheels.

2. A multi-wheel compactor roller comprising a main frame, a group of compacting wheels adapted to traverse a ground surface for compacting the material thereof, means mounting said group of compacting wheels on the main frame, said mounting means including an individual support for each wheel independently supporting the wheel, means mounting each individual support for adjustment in an upright plane for raising and lowering each wheel to conform the several wheels of the group of compacting wheels to the contour of the ground surface traversed by the wheels, an individual hydraulic power device for each individual support and its respective wheel for transmitting force to the wheel to load the wheel, means connecting each individual hydraulic power device between the main frame and its respective support, and hydraulic pressure transmitting means connecting the respective hydraulic power devices to each other and operative in response to the raising and lowering of any of the wheels relatively to each other to transmit hydraulic pressure from any of said hydraulic power devices to any other of said hydraulic power devices to equally load each wheel in all positions of the wheels relatively to each other during traverse of a ground surface by the wheels.

3. A multi-wheel compactor roller comprising a main frame, a group of compacting wheels adapted to traverse a ground surface for compacting the material thereof, means mounting said group of compacting wheels on the main frame, said mounting means including an individual support for each wheel comprising an arm pivotally mounted on a transversely extending axis and independently supporting the wheel, means mounting each said pivoted arm for adjustment in an upright plane for raising and lowering each wheel to conform the several wheels of the group of compacting wheels to the contour of the ground surface traversed by the wheels, an individual loading device for each individual support and its respective wheel for transmitting force to the wheel to load the wheel, means connecting each individual loading device between the main frame and the pivotally mounted arm of its respective support, and force transmitting means connecting the respective loading devices to each other and operative in response to the raising and lowering of any of the wheels relatively to each other to transmit force from any of said loading devices to any other of said loading devices to equally load each wheel in all positions of the wheels relative to each other during traverse of a ground surface by the wheels.

4. A multi-wheel compactor roller comprising a main frame, a group of compacting wheels adapted to traverse a ground surface for compacting the material thereof, means mounting said group of compacting wheels on the main frame, said mounting means including an individual support for each wheel comprising an arm pivotally mounted on a transversely extending axis and independently supporting the wheel, means mounting each pivoted arm for adjustment in an upright plane for raising and lowering each wheel to conform the several wheels of the group of compacting wheels to the contour of the ground surface traversed by the wheels, an individual hydraulic power device for each individual support and its respective wheel for transmitting force to the wheel to load the wheel, means connecting each individual hydraulic power device between the main frame and the pivotally mounted arm of its respective support, and hydraulic pressure transmitting means connecting the respective hydraulic power devices to each other and operative in response to the raising and lowering of any of the wheels relatively to each other to transmit hydraulic pressure from any of said hydraulic power devices to any other of said hydraulic power devices to equally load each wheel in all positions of the wheels relatively to each other during traverse of a ground surface by the wheels.

5. A multi-wheel compactor roller comprising a main frame, a ballast bunker integrally formed in the main frame at each side thereof, said ballast bunkers being laterally spaced to provide a free area extending longitudinally through the main frame to form a compartment between said ballast bunkers for the placement of operating elements of the compactor roller, a front group of compacting wheels and a rear group of compacting wheels each adapted to traverse a ground surface for compacting the material thereof, means mounting the front group of compacting wheels on the main frame in front of said ballast bunkers, and means mounting the rear group of compacting wheels on the main frame behind the ballast bunkers, power means for driving the compactor roller and controls for operating said power means supported on the main frame in the compartment formed between the ballast bunkers.

6. A multi-wheel compactor roller comprising a main frame, a ballast bunker integrally formed in the main frame at each side thereof, said ballast bunkers being laterally spaced to provide a free area extending longitudinally through the main frame to form a compartment between said ballast bunkers for the placement of operating elements of the compactor roller, power means for driving the compactor roller and controls for operating said power means and the compactor roller, said power means and controls being mounted on a frame and forming a unitary assembly, means for securing said unitary assembly to the main frame in the compartment formed between said ballast bunkers, a front group of compacting wheels and a rear group of compacting wheels each adapted to traverse a ground surface for compacting the material thereof, means mounting the front group of compacting wheels on the main frame in front of the ballast bunkers, and means mounting the rear group of compacting wheels on the main frame behind the ballast bunkers.

7. A multi-wheel compactor roller comprising a main frame, a group of compacting wheels adapted to traverse a ground surface for compacting the material thereof, means mounting said group of compacting wheels on the main frame, said mounting means including an individual support for each wheel independently supporting the wheel, each said individual support including an arm and means pivotally mounting the arm on the main frame for raising and lowering a wheel to conform the several wheels of the group of compacting wheels to the contour of the ground surface traversed by the wheels, at least two of said pivoted arms each comprising a drive means for a wheel to propel the compactor, the drive means for each wheel comprising chain and gear means, a first power shaft for driving the chain and gear means to one of the driven wheels, a second power shaft for supplying power to the chain and gear means for another of the driven wheels, said power shafts being concentrically disposed one within the other, and the pivot axis for the pivoted arms being coincident with the axis of the power shafts.

8. A multi-wheel compactor roller as recited in claim 7 including power transmission means for driving the power shafts, said transmission means including a differential gear means for each power shaft.

9. A multi-wheel compactor roller comprising a main frame, a group of compacting wheels transversely aligned with respect to the main frame to traverse a ground surface for compacting the material thereof, means mounting said group of compacting wheels on the main frame, said mounting means including an individual support for each wheel independently supporting the wheel, means mounting each individual support for adjustment in an upright plane for raising and lowering the wheel to conform the several wheels of the group of compacting wheels to the contour of the ground surface traversed by the wheels, a hydraulic power means connected to each individual support, means for supplying hydraulic fluid under pressure to each power means to load each wheel in all positions thereof, hydraulic connections between said hydraulic power means for transmitting hydraulic pressure between the hydraulic power means for equalizing the pressure of the hydraulic fluid in the several hydraulic power means to uniformly load the several wheels, the hydraulic connections to the hydraulic power means for one of said wheels of said group of wheels including a normally open valve through which the pressure of the hydraulic fluid is transmitted among the several hydraulic power means and a one way check valve permitting flow of hydraulic fluid to the power means for said one wheel and blocking the flow of hydraulic fluid therefrom for transmitting an increase of fluid pressure to the power means for said one wheel from the power means for the other wheels, and means for closing the normally open valve for connecting the power means for said one wheel solely to the check valve to maintain a minimum pressure of hydraulic fluid in the power means for the one wheel and for transmission of an increase of fluid pressure in the power means for said other wheels to the power means for said one wheel.

10. A multi-wheel compactor roller as recited in claim 9 in which the means for closing the normally open valve includes operating means responsive to tilting of the compactor roller for closing said valve when the compactor roller is tilted.

11. A multi-wheel compactor roller as recited in claim 9 in which the normally open valve includes a spool for alternately connecting the hydraulic power means for the one wheel directly to the power means for the other wheels of said group of wheels or making said connection of the hydraulic power means for the one wheel through the one way check valve.

12. A multi-wheel compactor roller as recited in claim 9 including a pivoted weight adapted to swing in a plane extending laterally of the roller and connected to the valve spool for operating the latter when the weight is swung.

13. A multi-wheel compactor roller comprising a main frame, a group of compacting wheels transversely aligned with respect to the main frame to traverse a ground surface for compacting the material thereof, means mounting said group of compacting wheels on the main frame, said mounting means including an individual support for each wheel independently supporting the wheel, means mounting each individual support for adjustment in an upright plane for raising and lowering the wheel to conform the several wheels of the group of compacting wheels to the contour of the ground surface traversed by the wheels, a hydraulic power means connected to each individual support, means for supplying hydraulic fluid under pressure to each power means to load each wheel in all positions thereof, hydraulic connections between said hydraulic power means for transmitting hydraulic pressure between the hydraulic power means for equalizing the pressure of the hydraulic fluid in the several hydraulic power means to uniformly load the several wheels in all positions thereof relatively to each other, the hydraulic connections to the hydraulic power means for one of the wheels of said group of wheels including a normally open valve through which the pressure of the hydraulic fluid is transmitted among the several hydraulic power means, and means for closing said normally open valve to maintain the pressure of the hydraulic fluid in the power means for said one wheel and the hydraulic connections transmitting hydraulic pressure between the other hydraulic power means for equalizing the pressure of the hydraulic fluid in the other hydraulic power means.

14. A multi-wheel compactor roller as recited in claim 13 in which the means for closing the normally open valve includes operating means responsive to tilting of the compactor roller for closing said valve when the compactor roller is tilted.

15. A multi-wheel compactor roller as recited in claim 13 including solenoid means for operating the normally open valve, and switch means connected to the solenoid means to close the valve.

16. A multi-wheel compactor roller as recited in claim 15 including pivoted weight means responsive to tilting of the compactor roller, said weight means including means to operate the switch means to close the normally open valve when the compactor roller is tilted.

17. A multi-wheel compactor roller comprising a main frame, a group of compacting wheels transversely aligned with respect to the main frame to traverse a ground surface for compacting the material thereof, means mounting said group of compacting wheels on the main frame, said mounting means including an individual support for each wheel independently supporting the wheel, means mounting each individual support for adjustment in an upright plane for raising and lowering the wheel to conform the several wheels of the group of compacting wheels to the contour of the ground surface traversed by the wheels, a hydraulic power means connected to each individual support, means for supplying hydraulic fluid under pressure to each power means to load each wheel in all positions thereof, hydraulic connections between said hydraulic power means for equalizing the pressure of the hydraulic fluid in the several hydraulic power means to uniformly load the several wheels, the hydraulic connections to the hydraulic power means for one of said wheels of said group of wheels including a one way check valve permitting the flow of hydraulic fluid to the power means for said one wheel and blocking the flow of hydraulic fluid therefrom to maintain a minimum pressure of hydraulic fluid in the power means for the one wheel.

18. A multi-wheel compactor roller comprising a main frame, a group of compacting wheels transversely aligned with respect to the main frame to traverse a ground surface for compacting the material thereof, means mounting said group of compacting wheels on the main frame, said mounting means including an individual support for each wheel independently supporting the wheel, means mounting each individual support for adjustment in an upright plane for raising and lowering the wheel to conform the several wheels of the group of compacting wheels to the contour of the ground surface traversed by the wheels, a hydraulic power means connected to each individual support, means for supplying hydraulic fluid under pressure to each power means to load each wheel in all positions thereof, hydraulic connections between said hydraulic power means for equalizing the pressure of the hydraulic fluid in the several hydraulic power means to uniformly load the several wheels, the hydraulic connections including hydraulic lines connecting to the hydraulic power means for one of said wheels of said group of wheels, one of said hydraulic lines including a normally open valve through which the pressure of the hydraulic fluid is transmitted among the several hydraulic power means, and means for closing said normally open valve to maintain a minimum pressure of the hydraulic fluid in the power means for said one wheel, and another of said hydraulic lines including a one way check valve permitting the flow of hydraulic fluid to the power means for said one wheel and blocking the flow of fluid therefrom also to maintain a minimum pressure of hydraulic fluid in the power means for the one wheel and permitting the transmission of an increase of pressure of hydraulic fluid in the power means for said other wheels to the power means for said one wheel.

19. A multi-wheel compactor roller as recited in claim 18 in which the means for closing the normally open valve includes operating means responsive to tilting of the compactor roller for closing said valve when the compactor roller is tilted.

20. A multi-wheel compactor roller comprising a main frame, a group of compacting wheels transversely aligned with respect to the main frame to traverse a ground surface for compacting the material thereof, means mounting said group of compacting wheels on the main frame, said mounting means including an individual support for each wheel independently supporting the wheel, means mounting each individual support for adjustment in an upright plane for raising and lowering the wheel to conform the several wheels of the group of compacting wheels to the contour of the ground surface traversed by the wheels, a hydraulic power means connected to each individual support, means for supplying hydraulic fluid under pressure to each power means to load each wheel in all positions thereof, hydraulic connections between said hydraulic power means for equalizing the pressure of the hydraulic fluid in the several hydraulic power means to uniformly load the several wheels, the hydraulic connections to the hydraulic power means for a wheel of said group of wheels that is located at the side of the compactor roller including a normally open valve through which the pressure of the hydraulic fluid is transmitted among the several hydraulic power means and a one way check valve permitting flow of hydraulic fluid to the power means for said one wheel and blocking flow of fluid therefrom for transmitting an increase of fluid pressure to the power means for said one wheel from the other power means, and means responsive to lateral tilting of the compactor in the direction of said one wheel operative to close the normally open valve for connecting the pwer means for said one wheel solely to the check valve to maintain a minimum pressure of hydraulic fluid in the power means for the one wheel and for transmission of an increase of fluid pressure in the power means for said other wheels to the power means for said one wheel.

21. A multi-wheel compactor roller as recited in claim 20 in which the responsive means comprises a weight adapted to swing in a plane extending laterally of the compactor roller, and means operated by the weight upon swinging of the latter to close the normally open valve.

22. A multi-wheel compactor roller comprising a main frame, a group of compacting wheels transversely aligned with respect to the main frame to traverse a ground surface for compacting the material thereof, means mounting said group of compacting wheels on the main frame, said mounting means including an individual support for each wheel independently supporting the wheel, means mounting each individual support for adjustment in an upright plane for raising and lowering the wheel to conform the several wheels of the group of compacting wheels to the contour of the ground surface traversed by the wheels, a hydraulic power means connected to each individual support, means for supplying hydraulic fluid under pressure to each power means to load each wheel in all positions thereof, hydraulic connections between said hydraulic power means for equalizing the pressure of the hydraulic fluid in the several hydraulic power means to uniformly load the several wheels, the hydraulic connections to the hydraulic power means for a wheel of said group of wheels that is located at the side of the compactor roller including a normally open valve through which the pressure of the hydraulic fluid is transmitted among the several hydraulic power means, and means responsive to lateral tilting of the compactor in the direction of said one wheel operative to close the normally open valve for maintaining the pressure of the hydraulic fluid in the power means for said one wheel.

23. A multi-wheel compactor roller comprising a main frame, a group of compacting wheels transversely aligned with respect to the main frame to traverse a ground surface for compacting the material thereof, means mounting said group of compacting wheels on the main frame, said mounting means including an individual support for each wheel independently supporting the wheel, means mounting each individual support for adjustment in an upright plane for raising and lowering the wheel to conform the several wheels of the group of compacting wheels to the contour of the ground surface traversed by the wheels, a hydraulic power means connected to each individual support, means for supplying hydraulic fluid under pressure to each power means to load each wheel in all positions thereof, hydraulic connections between said hydraulic power means for equalizing the pressure of the hydraulic fluid in the several hydraulic power means to uniformly load the several wheels, the hydraulic connections to the hydraulic power means for each wheel of said group of wheels that is located at a side of the compactor roller including a normally open valve through which the pressure of the hydraulic fluid is transmitted among the several hydraulic power means and a one way check valve permitting flow of hydraulic fluid to the power means for each of said side wheels and blocking flow of fluid therefrom for maintaining a minimum pressure of hydraulic fluid in the power means for each side wheel, and means responsive to lateral tilting of the compactor roller in the direction of either of said side wheels operative to close the normally open valve for connecting the power means for the one side wheel in the direction of which the compactor roller is tilted solely to the check valve.

References Cited in the file of this patent

UNITED STATES PATENTS

| | | |
|---|---|---|
| 2,270,390 | Summers | Jan. 20, 1942 |
| 2,443,147 | Ritchie | June 8, 1948 |
| 2,491,275 | Millikin | Dec. 13, 1949 |
| 2,520,266 | Adams | Aug. 29, 1950 |
| 2,621,427 | Hulse | Dec. 16, 1952 |
| 2,721,405 | Gardner | Oct. 25, 1955 |
| 2,777,709 | Tucker | Jan. 15, 1957 |
| 2,846,635 | Shea | Aug. 5, 1958 |
| 2,943,541 | Dunn et al. | July 5, 1960 |
| 2,954,088 | Williamson et al. | Sept. 27, 1960 |

FOREIGN PATENTS

| | | |
|---|---|---|
| 1,041,818 | France | June 3, 1953 |
| 1,071,237 | France | Mar. 3, 1954 |
| 506,005 | Italy | 1957 |
| 514,955 | Italy | Sept. 1957 |